(12) United States Patent
Kurematsu

(10) Patent No.: US 11,320,027 B2
(45) Date of Patent: May 3, 2022

(54) TENSIONER

(71) Applicant: TSUBAKIMOTO CHAIN CO., Osaka (JP)

(72) Inventor: Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 100 days.

(21) Appl. No.: 16/918,191

(22) Filed: Jul. 1, 2020

(65) Prior Publication Data

US 2021/0010570 A1   Jan. 14, 2021

(30) Foreign Application Priority Data

Jul. 12, 2019   (JP) .............................. JP2019-130133

(51) Int. Cl.
*F16H 7/08*   (2006.01)

(52) U.S. Cl.
CPC ............. *F16H 7/0848* (2013.01); *F16H 7/08* (2013.01); *F16H 2007/0802* (2013.01); *F16H 2007/0806* (2013.01); *F16H 2007/0812* (2013.01); *F16H 2007/0859* (2013.01)

(58) Field of Classification Search
CPC ............... F16H 7/08; F16H 2007/0802; F16H 2007/0806; F16H 2007/0812; F16H 7/0848; F16H 2007/0859; F16H 2007/0891; F16H 2007/0895; F16H 2007/0897
USPC .......................................................... 474/110
See application file for complete search history.

(56) References Cited

U.S. PATENT DOCUMENTS

| 6,602,154 | B1 * | 8/2003 | Guichard | ................... | F16H 7/08 |
| | | | | | 474/101 |
| 2004/0092348 | A1 * | 5/2004 | Hashimoto | ........... | F16H 7/0848 |
| | | | | | 474/109 |
| 2007/0179001 | A1 * | 8/2007 | Sass | ...................... | F16H 7/0848 |
| | | | | | 474/109 |
| 2008/0318717 | A1 * | 12/2008 | Kurematsu | ........... | F16H 7/0848 |
| | | | | | 474/110 |
| 2014/0100068 | A1 * | 4/2014 | Kurematsu | ............... | F16H 7/08 |
| | | | | | 474/110 |

(Continued)

FOREIGN PATENT DOCUMENTS

| JP | 2015-183767 A | 10/2015 |
| JP | 2016-89854 A | 5/2016 |

*Primary Examiner* — Michael R Mansen
*Assistant Examiner* — Raveen J Dias
(74) *Attorney, Agent, or Firm* — WHDA, LLP

(57) ABSTRACT

An object of the present invention is to provide a tensioner that enables a sufficient amount of stroke for the plunger to be secured and allows for size and weight reductions without changing the size of the tensioner body. In the tensioner according to the invention, an oil supply path that supplies oil from outside to an oil reservoir chamber formed inside the plunger includes an oil supply space formed between an inner circumferential surface of the plunger bore and an outer circumferential surface of the plunger. The oil supply space is formed by a front-end communication groove formed on an inner circumferential surface of the plunger bore and communicating with a tensioner body oil supply hole, and a rear-end communication groove formed on an outer circumferential surface of the plunger and causing the front-end communication groove to communicate with a plunger oil supply hole.

2 Claims, 6 Drawing Sheets

(56) References Cited

U.S. PATENT DOCUMENTS

| | | | |
|---|---|---|---|
| 2014/0200104 A1* | 7/2014 | Kurematsu | F16H 7/08 474/110 |
| 2015/0267789 A1 | 9/2015 | Kurematsu et al. | |
| 2015/0292602 A1* | 10/2015 | Kurematsu | F16H 7/0848 474/110 |
| 2016/0084359 A1* | 3/2016 | Wigsten | F16H 7/0836 474/110 |
| 2016/0123435 A1 | 5/2016 | Yoshida et al. | |
| 2016/0153530 A1* | 6/2016 | Kitamura | F16H 7/08 474/110 |
| 2016/0186838 A1* | 6/2016 | Kurematsu | F16H 7/08 474/110 |
| 2016/0348765 A1* | 12/2016 | Ishikawa | F16H 7/0836 |
| 2017/0059012 A1* | 3/2017 | Watanabe | F16H 7/0848 |
| 2017/0130807 A1* | 5/2017 | Kurematsu | F16H 7/0848 |
| 2017/0356529 A1* | 12/2017 | Simmons | F16H 7/0848 |
| 2018/0087628 A1* | 3/2018 | Maeda | F16H 7/0836 |
| 2018/0363740 A1* | 12/2018 | Kimura | F16H 7/0848 |
| 2019/0011022 A1* | 1/2019 | Miyazawa | F16K 27/0245 |
| 2019/0107178 A1* | 4/2019 | Yoshida | F16H 7/0848 |
| 2019/0257390 A1* | 8/2019 | Watanabe | F16H 7/08 |
| 2019/0257392 A1* | 8/2019 | Watanabe | F16H 7/08 |

\* cited by examiner

RELATED ART

RELATED ART

RELATED ART

TENSIONER

BACKGROUND OF THE INVENTION

1. Field of the Invention

The present invention relates to a tensioner used for applying appropriate tension to a drive belt or a drive chain in a timing system of, for example, an engine.

2. Description of the Related Art

It has been the common practice to use a tensioner for maintaining appropriate tension of a chain, for example, in a chain guide mechanism that slidably guides a drive chain such as an endless roller chain passing over respective sprockets of a crankshaft and a cam shaft inside an engine room with a guide shoe.

As one example of a known tensioner used in such a chain guide mechanism, there is one configured to include a tensioner body having a plunger bore that is open on a front side, a cylindrical plunger slidably accommodated in the plunger bore and having a plunger hole that is open on a rear side, a check valve partitioning a space between the tensioner body and the plunger into an oil reservoir chamber on the front side and an oil pressure chamber on the rear side and allowing oil to flow into the oil pressure chamber while stopping the oil from flowing reversely into the oil reservoir chamber, a main biasing means accommodated in the oil pressure chamber such as to freely expand and contract and urging the plunger in a protruding direction, and an oil supply path that supplies oil to the oil reservoir chamber from outside the tensioner body (see Japanese Patent Application Laid-open Nos. 2015-183767 and 2016-089854).

This tensioner prevents oil from leaking out and allows a certain amount of oil to remain in the oil reservoir chamber, so that the oil remaining in the oil reservoir chamber is supplied to the oil pressure chamber even immediately after the start-up after a long stop to maintain the damping force of oil for the plunger and to prevent vibration or damage of the chain.

SUMMARY OF THE INVENTION

Tensioners are required to have a sufficient amount of stroke for the plunger for compensation of tension fluctuations of the chain.

The tensioner mentioned above has an oil supply path made up of a tensioner body oil supply hole, a plunger oil supply hole, and an oil supply space formed between an inner circumferential surface of the plunger bore and an outer circumferential surface of the plunger to cause the tensioner body oil supply hole to communicate with the plunger oil supply hole. The oil supply space is provided by forming a communication groove, for example, on one of the outer circumferential surface of the plunger and the inner circumferential surface of the plunger bore such as to communicate the tensioner body oil supply hole with the plunger oil supply hole. In either case, there is an issue that the plunger stroke is limited, and it is hard to secure a sufficient plunger stroke necessary for practical use.

To be more specific, let us consider a tensioner 200 having an oil supply space 106, which communicates the tensioner body oil supply hole 114 with the plunger oil supply hole 122, and which is formed only by a communication groove 226 provided on the outer circumferential surface of the plunger 220, as illustrated in FIGS. 7A and 7B. If the plunger 220 moves in the protruding direction of the plunger to an extent that the front end of the communication groove 226 goes beyond the open end of the plunger bore 211 and comes to the front in the protruding direction of the plunger, there is a possibility that the oil flows out from the opening of the plunger bore 211 through a gap between the outer circumferential surface of the plunger 22C and the inner circumferential surface of the plunger bore 211.

Accordingly, the seal limit of the seal provided by the wall surface of the tensioner body 210 is determined by the length H1 in the protruding direction of the plunger from the open end of the plunger bore 211 to the front end of the communication groove 226. To avoid oil leakage from the oil pressure chamber 102, the communication groove 226 must be formed such that the front end thereof does not go beyond the open end of the plunger bore 211 and does not come to the front in the protruding direction of the plunger when the plunger 220 is protruded at the maximum stroke Smax as illustrated in FIG. 7B. In FIGS. 7A and 7B, reference numeral 101 denotes an oil reservoir chamber, 130 a check valve, and 140 a main biasing means.

Let us consider another tensioner 300 having an oil supply space 106, which communicates the tensioner body oil supply hole 114 with the plunger oil supply hole 122, and which is formed only by a communication groove 316 provided on the inner circumferential surface of the plunger bore 311 in the tensioner body 310, as illustrated in FIGS. 8A and 8B. If the plunger 320 moves in the protruding direction of the plunger to an extent that the rear end of the plunger 320 goes beyond the rear end of the communication groove 316 and comes to the front in the protruding direction of the plunger, there is a possibility that the oil flows out of the oil pressure chamber 102 because the oil pressure chamber 102 is directly communicated with the tensioner body oil supply hole 114 via the communication groove 316.

Accordingly, the seal limit of the seal provided by the wall surface of the tensioner body 310 is determined by the length H2 in the protruding direction of the plunger from the rear end of the plunger 320 to the rear end of the communication groove 316. To avoid oil leakage from the oil pressure chamber 102, the communication groove 316 must be formed such that the rear end of the plunger 320 does not go beyond the rear end of the communication groove 316 and does not come to the front in the protruding direction of the plunger when the plunger 320 is protruded at the maximum stroke Smax as illustrated in FIG. 8B.

As described above, in the case where the oil supply space is provided by forming a communication groove on one of the outer circumferential surface of the plunger and the inner circumferential surface of the plunger bore, there is an issue that the plunger stroke is limited because of the seal limits of the seal provided by the wall surface of the tensioner body, and it is hard to secure a sufficient plunger stroke necessary for practical use.

In order to secure a sufficient amount of stroke for the plunger, it is necessary to increase the entire length of the tensioner, which causes an increase in size and weight of the tensioner and is not desirable.

An object of the present invention is to provide a tensioner that solves these issues and enables a sufficient plunger stroke to be secured to allow for size and weight reductions without changing the size of the tensioner body.

A tensioner according to the present invention includes: a tensioner body having a plunger bore that is open on a front side; a cylindrical plunger slidably accommodated in the plunger bore and having a plunger hole that is open on a rear side; a check valve partitioning a space between the tensioner body and the plunger into an oil reservoir chamber on the front side and an oil pressure chamber on the rear side and allowing oil to flow into the oil pressure chamber while stopping the oil from flowing reversely into the oil reservoir chamber; a main biasing means accommodated in the oil pressure chamber such as to freely expand and contract and urging the plunger in a protruding direction; and an oil supply path that supplies oil to the oil reservoir chamber from outside the tensioner body. The oil supply path includes a tensioner body oil supply hole extending from outside the tensioner body through to an inner circumferential surface of the plunger bore, a plunger oil supply hole extending from an outer circumferential surface of the plunger through to an inner circumferential surface of the plunger hole, and an oil supply space formed between an inner circumferential surface of the plunger bore and an outer circumferential surface of the plunger and communicating the tensioner body oil supply hole with the plunger oil supply hole. The oil supply space is formed by a front-end communication groove formed on an inner circumferential surface of the plunger bore and communicating with the tensioner body oil supply hole, and a rear-end communication groove formed on an outer circumferential surface of the plunger and causing the front-end communication groove to communicate with the plunger oil supply hole. This configuration solves the issues described above.

According to the tensioner set forth in claim 1, the seal limits of the seal provided by the wall surface of the tensioner body for preventing the oil from flowing out are alleviated, so that a sufficient amount of stroke for the plunger can be secured without changing the size of the tensioner body. Thus tension fluctuations of the chain can be reliably compensated, and size and weight reductions of the tensioner are made possible, which improves the space efficiency and contributes to better fuel economy.

According to the configurations set forth in claim 2 and claim 3, the plunger stroke can be made as large as possible, so that tension fluctuations of the chain can be reliably compensated, and the degree of design freedom of the oil supply path is increased.

Figure 1:
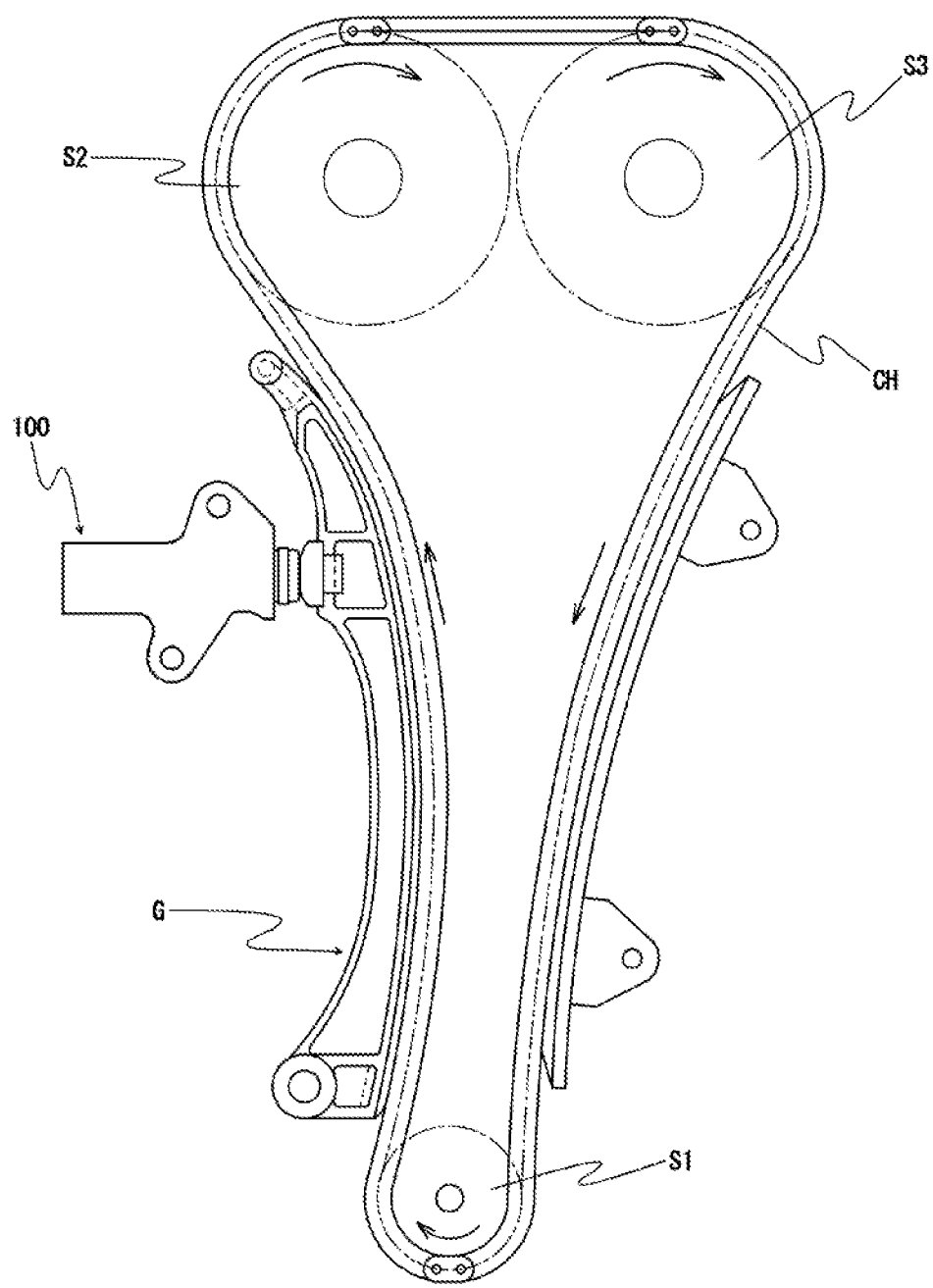
FIG. 1 is an illustrative diagram illustrating one mode of use of a tensioner according to one embodiment of the present invention.
Figure 5:
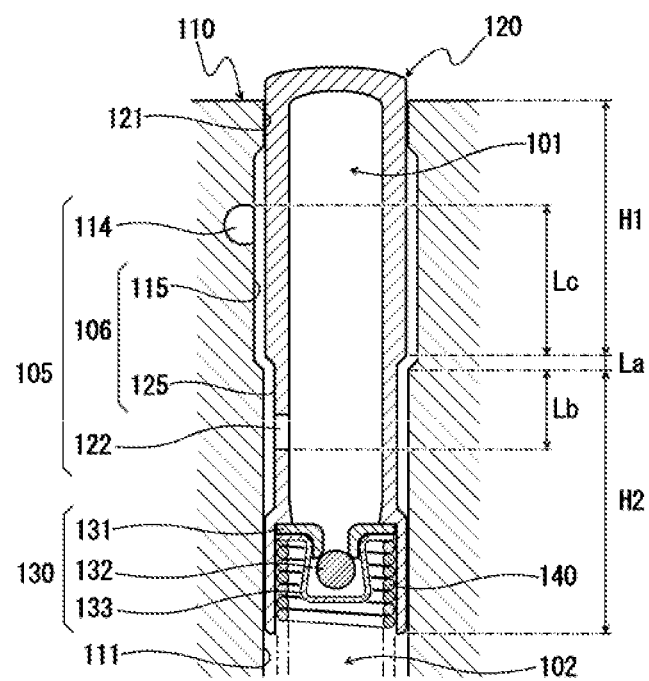
Figure 6:
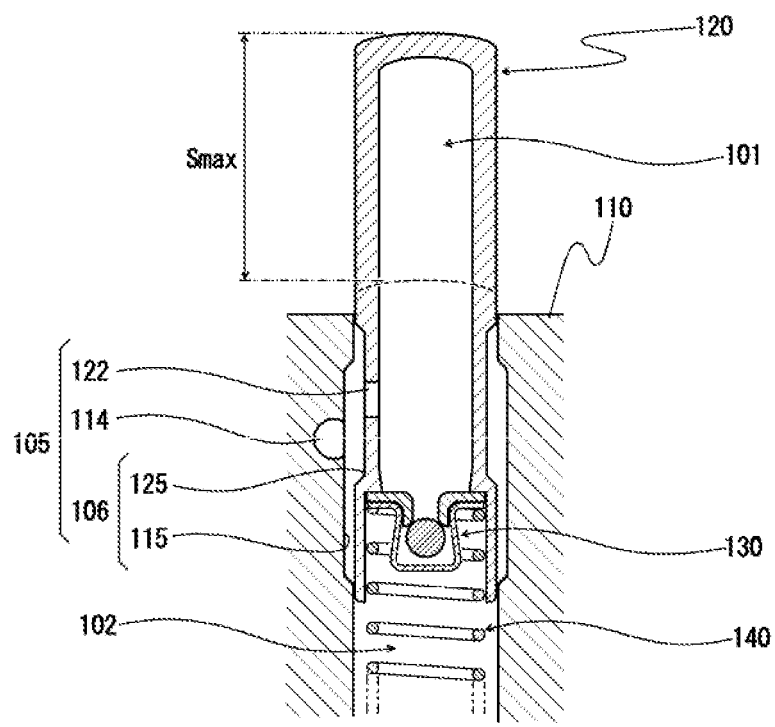
Figure 7A:
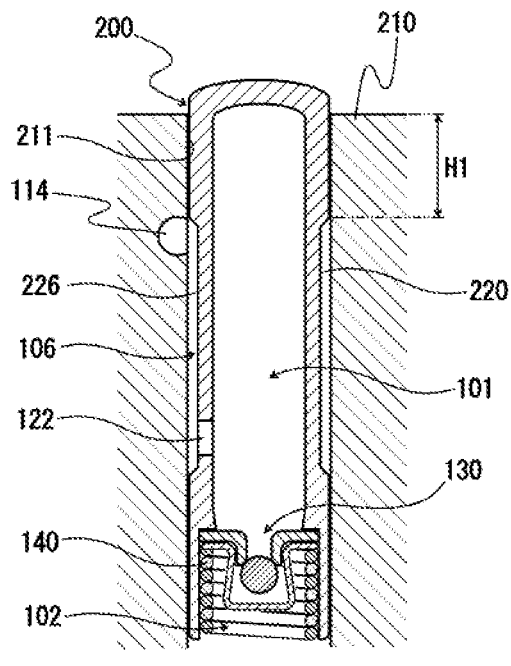
Figure 7B:
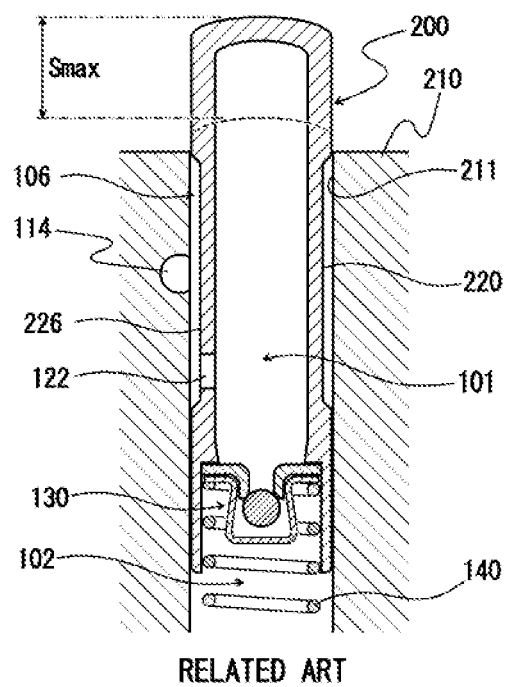
Figure 8A:
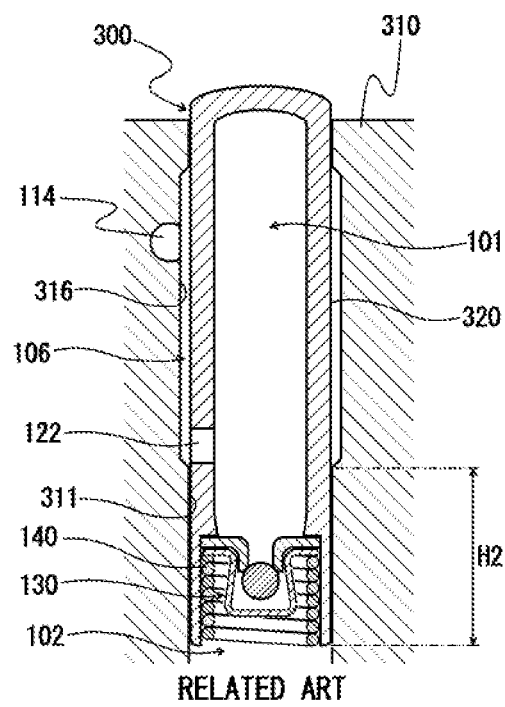
Figure 8B:
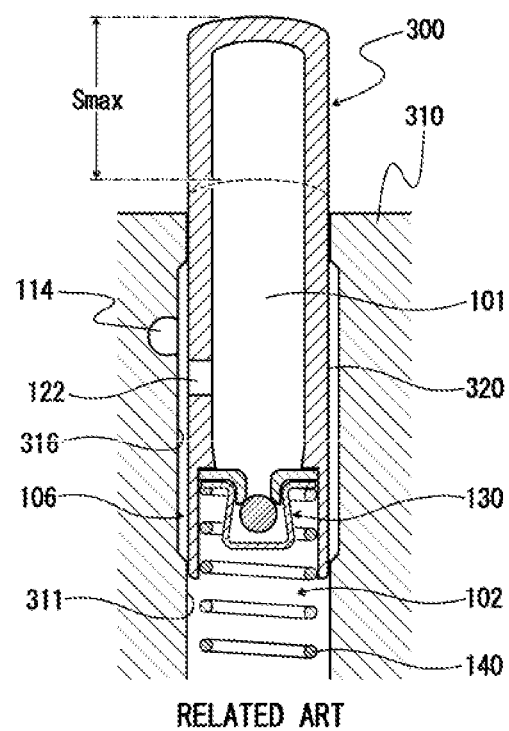

FIG. A is a cross-sectional view illustrating a schematic configuration of a plunger of the tensioner shown in FIG. 1;

FIG. 5 is an enlarged cross-sectional view illustrating a schematic configuration of relevant parts in the tensioner shown in FIG. 1;

FIG. 6 is a schematic diagram illustrating the tensioner of FIG. 1 in a state in which the plunger is protruded at a maximum set stroke;

FIGS. 7A and 7B are schematic diagrams illustrating a configuration of relevant parts in one example of an existing tensioner, FIG. 7A illustrating a state in which the plunger is pushed to a rearmost position, and FIG. 7B illustrating a state in which the plunger is protruded at a maximum set stroke; and FIGS. 8A and 8B are schematic diagrams illustrating a configuration of relevant parts in another example of an existing tensioner, FIG. 8A illustrating a state in which the plunger is pushed to a rearmost position, and FIG. 8B illustrating a state in which the plunger is protruded at a maximum set stroke.

DESCRIPTION OF THE PREFERRED EMBODIMENTS

Hereinafter, a tensioner according to one embodiment of the present invention will be described with reference to the drawings.

As illustrated in FIG. 1, the tensioner 100 of this embodiment is incorporated in a chain drive device used in a timing system or the like of a car engine to apply appropriate tension to the slack side of a drive chain CH passed over a plurality of sprockets S1 to S3 via a tensioner lever G to reduce vibration during the drive.

Figure 2:
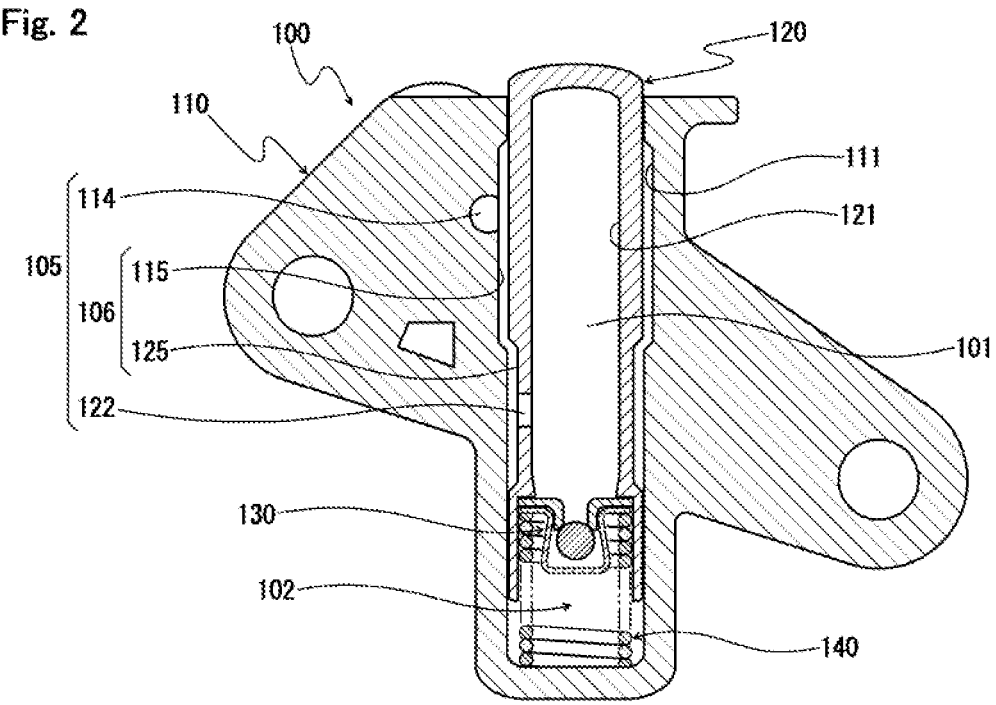
FIG. 2 is a cross-sectional view illustrating a schematic configuration of the tensioner according to one embodiment of the present invention.

As illustrated in FIG. 2, the tensioner 100 includes a tensioner body 110 having a plunger bore 111 that is open on a front side, a cylindrical plunger 120 slidably accommodated in the plunger bore 111 and having a plunger hole 121 that is open on a rear side, a check valve 130 partitioning a space between the tensioner body 110 and the plunger 120 into an oil reservoir chamber 101 on the front side and an oil pressure chamber 102 on the rear side and allowing oil to flow into the oil pressure chamber 102 while stopping the oil from flowing reversely into the oil reservoir chamber 101, a main biasing means 140 accommodated in the oil pressure chamber 102 such as to freely expand and contract and urging the plunger 120 in a protruding direction, and an oil supply path 105 that supplies oil to the oil reservoir chamber 101 from outside the tensioner body 110.

Figure 3:
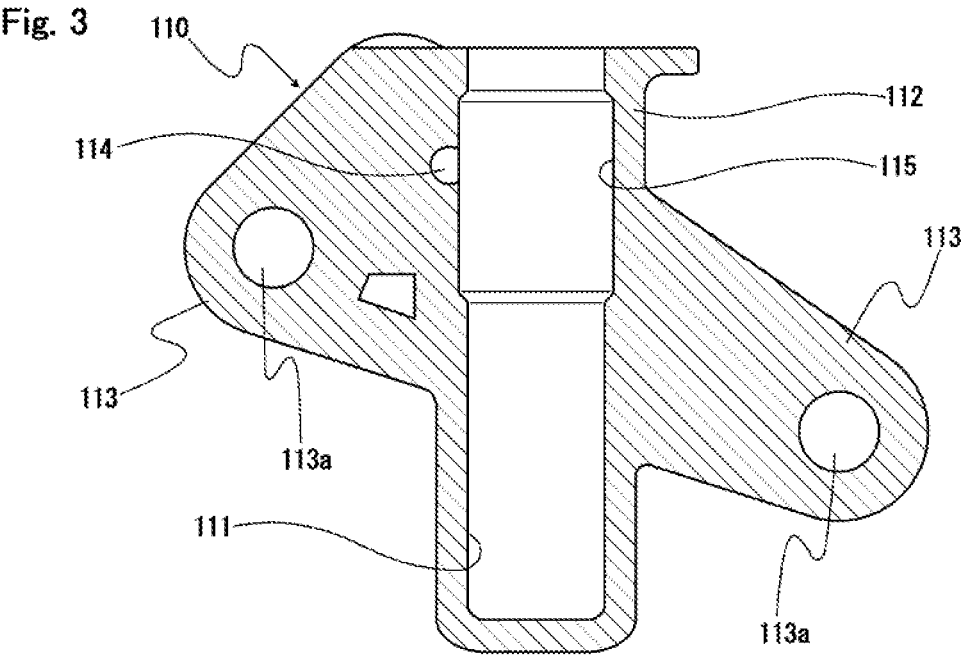
FIG. 3 is a cross-sectional view illustrating a schematic configuration of a tensioner body of the tensioner shown in FIG. 1.

The tensioner body 110 is made of metal such as aluminum alloy, for example, or synthetic resin and the like, and includes, as illustrated in FIG. 3, a columnar main body 112 having the plunger bore 111, and an attachment part. 113 integrally formed with the main body 112 to be used for securely attaching the tensioner to an engine block or the like. The attachment part. 113 has attachment holes 113a for bolts or the like to pass through.

The tensioner body 110 is formed with a tensioner body oil supply hole 114 that extends from outside the tensioner body 110 through to an inner circumferential surface of the plunger bore 111.

The plunger 120 is made of metal such as iron and formed as a cylindrical dead end hole.

Figure 4:
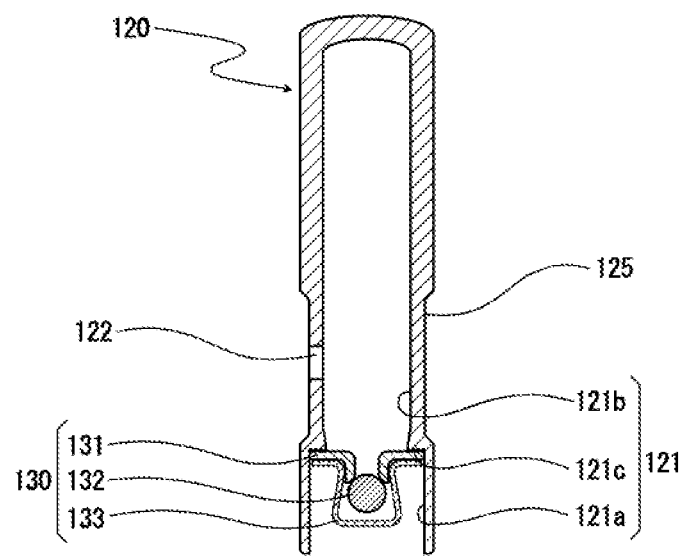

The plunger hole 121 of the plunger 120 includes a large-diameter hole 121a formed on the rear side and a small-diameter hole 121b on the front side continuously formed on the front side of the large-diameter hole 121a via a step 121c as illustrated in FIG. 4. The large-diameter hole 121a and small-diameter hole 121b are formed to be concentric with each other.

The plunger 120 is formed with a plunger oil supply hole 122 extending from an outer circumferential surface thereof through to an inner circumferential surface of the small-diameter hole 121b that defines the oil reservoir chamber 101.

The check valve 130 is made up of a ball seat 131 disposed in tight contact with an end face of the step 121c inside the large-diameter hole 121a of the plunger hole 121, a check ball 132 that can be seated on the ball seat 131 in tight contact therewith, and a retainer 133 arranged on the front side of the check ball 132 to restrict the movement of the check ball 132.

The components making up the check valve 130 are each made of metal or synthetic resin and the like.

The check valve 130 may have any specific configuration as long as it allows the oil to flow into the oil pressure chamber 102 but stops the oil from flowing reversely into the oil reservoir chamber 101. For example, a spring that urges the check ball 132 toward the ball seat 131 may be disposed between the check ball 132 and the retainer 133.

The main biasing means 140 is a coil spring made of a round wire coiled into a helical shape, for example.

The main biasing means 140 is set inside the oil pressure chamber 102, with its front end abutted on a flange part of the retainer 133 and its rear end abutted on a bottom part of the plunger bore 111 such that the coil axis extends along the center axis of the plunger 120. This way, the main biasing means 140 urges the plunger 120 to the front side, as well as presses the retainer 133 and ball seat 131 of the check valve 130 against the step 121*c* to retain the check valve 130 inside the large-diameter hole 121*a*.

The oil supply path 105 is made up of the tensioner body oil supply hole 114, the plunger oil supply hole 122, and an oil supply space 106 formed between an inner circumferential surface of the plunger bore 111 and an outer circumferential surface of the plunger 120 to cause the tensioner body oil supply hole 114 to communicate with the plunger oil supply hole 122, as also illustrated in FIG. 5.

In the tensioner 100 of this embodiment, a front-end communication groove 115 that communicates with the tensioner body oil supply hole 114 is formed on the inner circumferential surface of the plunger bore 111 of the tensioner body 110, and a rear-end communication groove 125 that communicates with the plunger oil supply hole 122 is formed on the outer circumferential surface of the plunger 120. That is, the oil supply space 106 is formed by the front-end communication groove 115 and the rear-end communication groove 125 that are set back from each other in the radial direction of the plunger 120.

The front-end communication groove 115 extends from a point spaced from the open end face of the plunger bore 111 rearward in the protruding direction of the plunger all around the inner circumferential surface of the plunger bore 111.

The rear-end communication groove 125 extends forward in the protruding direction of the plunger in a rear end portion of the circumferential wall that defines the small-diameter hole 121*b* all around the outer circumferential surface of the plunger 120.

In the tensioner 100 of this embodiment, it is preferable to form the front-end communication groove 115 and the rear-end communication groove 125 such as to satisfy relations La<Lb and La<Lc, where La represents a length along the protruding direction of the plunger between the rear end of the front-end communication groove 115 and the front end of the rear-end communication groove 125, Lb represents a length along the protruding direction of the plunger between the rear end of the front-end communication groove 115 and the rear end of the opening edge of the plunger oil supply hole 122, and Lc represents a length along the protruding direction of the plunger between the front end of the rear-end communication groove 125 and the front end of the opening edge of the tensioner body oil supply hole 114, in a state in which the plunger 120 is pushed to a rearmost position as illustrated in FIG. 5.

This configuration allows for larger stroke settings for the plunger 120 as compared to tensioners in which the oil supply space 106 is provided only by a communication groove on the inner circumferential surface of the plunger bore 111, or tensioners in which the oil supply space 106 is provided only by a communication groove on the outer circumferential surface of the plunger 120.

It is also preferable to form the front-end communication groove 115 and the rear-end communication groove 125 such as to satisfy a relation H1=H2, where H1 represents a distance along the protruding direction of the plunger between the front end of the rear-end communication groove 125 and the open end of the plunger bore 111, and H2 represents a distance along the protruding direction of the plunger between the rear end of the front-end communication groove 115 and the rear end of the plunger 120 in the state in which the plunger 120 is pushed to the rearmost position. This configuration enables the stroke of the plunger 120 to be as large as possible.

According to the tensioner 100 of this embodiment, since the oil supply space 106 that communicates the tensioner body oil supply hole 114 with the plunger oil supply hole 122 is formed by the front-end communication groove 115 and the rear-end communication groove 125 that are set back from each other in the radial direction of the plunger 120, the seal limits of the seal provided by the wall surface of the tensioner body 110 for preventing the oil from leaking out are alleviated.

For a tensioner 200 in which the oil supply space 106 is formed only by a communication groove 226 provided on the outer circumferential surface of the plunger 120 as illustrated in FIG. 7A, it is required to form the communication groove 226 such as to communicate the tensioner body oil supply hole 114 with the plunger oil supply hole 122 in a state in which the plunger 220 is pushed to the rearmost position.

In contrast, the rear-end communication groove 125 on the outer circumferential surface of the plunger 120 of the tensioner 100 of this embodiment only needs to cause the front-end communication groove 115 that communicates with the tensioner body oil supply hole 114 to communicate with the plunger oil supply hole 122. This allows the sealing properties provided by the wall surface of the tensioner body 110 to be secured as illustrated in FIG. 6 and prevents oil leakage to the outside. Accordingly, the distance H1 along the protruding direction of the plunger between the open end of the plunger bore 111 and the front end of the rear-end communication groove 125 can be set larger as compared to the tensioner 200 having the oil supply space 106 formed only by the communication groove 226 on the outer circumferential surface of the plunger 120, as a result of which the maximum set stroke Smax of the plunger 120 can be increased.

For a tensioner 300 in which the oil supply space 106 is formed only by a communication groove 316 provided on the inner circumferential surface of the plunger bore 111 as illustrated in FIG. 8A, it is required to form the communication groove 316 such as to communicate the tensioner body oil supply hole 114 with the plunger oil supply hole 122 in a state in which the plunger 320 is pushed to the rearmost position.

In contrast, the front-end communication groove 115 on the inner circumferential surface of the plunger bore 111 of the tensioner 100 of this embodiment only needs to cause the rear-end communication groove 125 that communicates with the plunger oil supply hole 122 to communicate with the tensioner body oil supply hole 114. This allows the sealing properties provided by the wall surface of the tensioner body 110 to be secured as illustrated in FIG. 6 and prevents oil leakage to the outside. Accordingly, the distance H2 along the protruding direction of the plunger between the rear end of the plunger 120 and the rear end of the front-end communication groove 115 can be set larger as compared to the tensioner 300 having the oil supply space 106 formed only by the communication groove 316 on the inner circumferential surface of the plunger bore 111, as a result of which the maximum set stroke Smax of the plunger 120 can be increased.

Accordingly, the tensioner 100 of this embodiment enables a sufficient amount of stroke for the plunger 120 to be secured without changing the size of the tensioner body 110. Thus tension fluctuations of the chain can be reliably compensated, and size and weight reductions of the tensioner 100 are made possible, which improves the space efficiency and contributes to better fuel economy.

While one embodiment of the present invention has been described in detail, the present invention is not limited to the above-described embodiment and may be carried out with various design changes without departing from the scope of the present invention set forth in the claims.

For example, while the tensioner is described as a component, to be incorporated in a timing system of a car engine in the embodiment above, the purpose of use of the tensioner is not limited to this specific application.

While the tensioner is described as a component that applies tension to a drive chain via a tensioner lever in the embodiment above, the plunger can directly guide the drive chain slidably with a distal end thereof to apply tension to the drive chain.

The tensioner may not necessarily be applied to a transmission mechanism with a drive chain but can also be used for similar transmission mechanisms that use belts, ropes and the like, and can be applied in a variety of industrial fields where it is desired to apply tension to an elongated component.

While the housing accommodating the plunger is described as the component known as a tensioner body that is attached to an engine block or the like in the embodiment described above, the housing is not limited to the specific form described above and may be a cylindrical component known as a sleeve inserted into a body hole formed in the tensioner body.

What is claimed is:

1. A tensioner comprising: a tensioner body having a plunger bore that is open on a front side; a cylindrical plunger slidably accommodated in the plunger bore and having a plunger hole that is open on a rear side; a check valve partitioning a space between the tensioner body and the cylindrical plunger into an oil reservoir chamber on the front side and an oil pressure chamber on the rear side and allowing oil to flow into the oil pressure chamber while stopping the oil from flowing reversely into the oil reservoir chamber; a main biasing means accommodated in the oil pressure chamber such as to freely expand and contract and urging the cylindrical plunger in a protruding direction; and an oil supply path that supplies oil to the oil reservoir chamber from outside the tensioner body, the oil supply path including a tensioner body oil supply hole extending from outside the tensioner body through to an inner circumferential surface of the plunger bore, a plunger oil supply hole extending from an outer circumferential surface of the cylindrical plunger through to an inner circumferential surface of the plunger hole, and an oil supply space formed between the inner circumferential surface of the plunger bore and the outer circumferential surface of the cylindrical plunger and communicating the tensioner body oil supply hole with the plunger oil supply hole, the oil supply space being formed by a front-end communication groove formed on the inner circumferential surface of the plunger bore and communicating with the tensioner body oil supply hole, and a rear-end communication groove formed on the outer circumferential surface of the cylindrical plunger and causing the front-end communication groove to communicate with the plunger oil supply hole, wherein the tensioner satisfies relations La<Lb and La<Lc, where La represents a length along the protruding direction of the cylindrical plunger between a rear end of the front-end communication groove and a front end of the rear-end communication groove, Lb represents a length along the protruding direction of the cylindrical plunger between the rear end of the front-end communication groove and a rear end of an opening edge of the plunger oil supply hole, and Lc represents a length along the protruding direction of the cylindrical plunger between the front end of the rear-end communication groove and a front end of an opening edge of the tensioner body oil supply hole, in a state in which the cylindrical plunger is pushed to a rearmost position.

2. The tensioner according to claim 1, wherein the tensioner satisfies a relation H1=H2, where H1 represents a distance along the protruding direction of the cylindrical plunger between the front end of the rear-end communication groove and an open end of the plunger bore, and H2 represents a distance along the protruding direction of the cylindrical plunger between the rear end of the front-end communication groove and a rear end of the cylindrical plunger, in the state in which the cylindrical plunger is pushed to the rearmost position.

* * * * *